Figure 2:
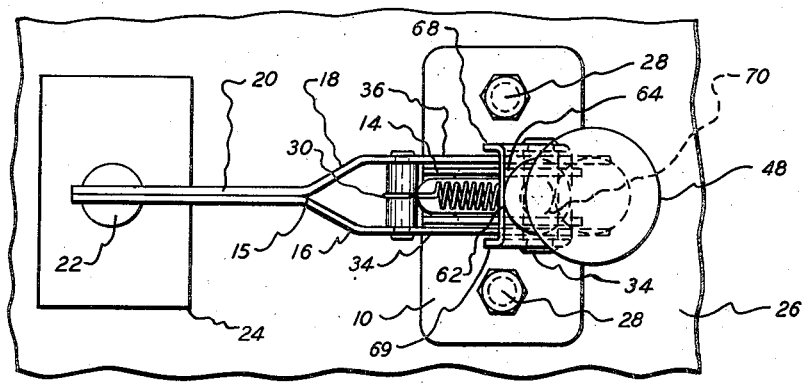

March 20, 1951     H. H. MERRIMAN     2,545,668
CLAMPING DEVICE
Filed Aug. 30, 1944

Inventor
HENRY H. MERRIMAN
By Beaman & Langford
Attorneys

Patented Mar. 20, 1951

2,545,668

UNITED STATES PATENT OFFICE 2,545,668

CLAMPING DEVICE

Henry H. Merriman, Jackson, Mich., assignor to Harry D. Boardman, Jackson, Mich., as trustee Application August 30, 1944, Serial No. 551,993

2 Claims. (Cl. 90—59)

The present invention relates to improvements in clamping devices having particular application to jigs and fixtures and for holding work pieces in machine tools. A great many different kinds of toggle and cam quick acting clamping devices are now in use, but their design is such that they do not lend themselves readily to quick adjustment to compensate for wear or variation in gauge or thickness of materials being clamped.

One of the objects of the present invention is to provide a quick acting clamp of the type described in which provision is made for conveniently adjusting the clamping action of the device.

Another object is to provide a quick acting clamp characterized by being capable of being rapidly moved from full open to full closed position, and having embodied therein adjustable take-up features to compensate for wear and variation in stock sizes and gauges.

A further object of the invention is to provide a quick acting cam clamp having an adjustable follower.

A still further object of the invention is to provide a quick acting cam clamp of the type described in which the follower is adjustably positioned through manipulation of the operating handle.

These and other objects and advantages residing in the combination, arrangement and construction of parts will more fully appear from a consideration of the following specification and appended claims.

Figure 1:
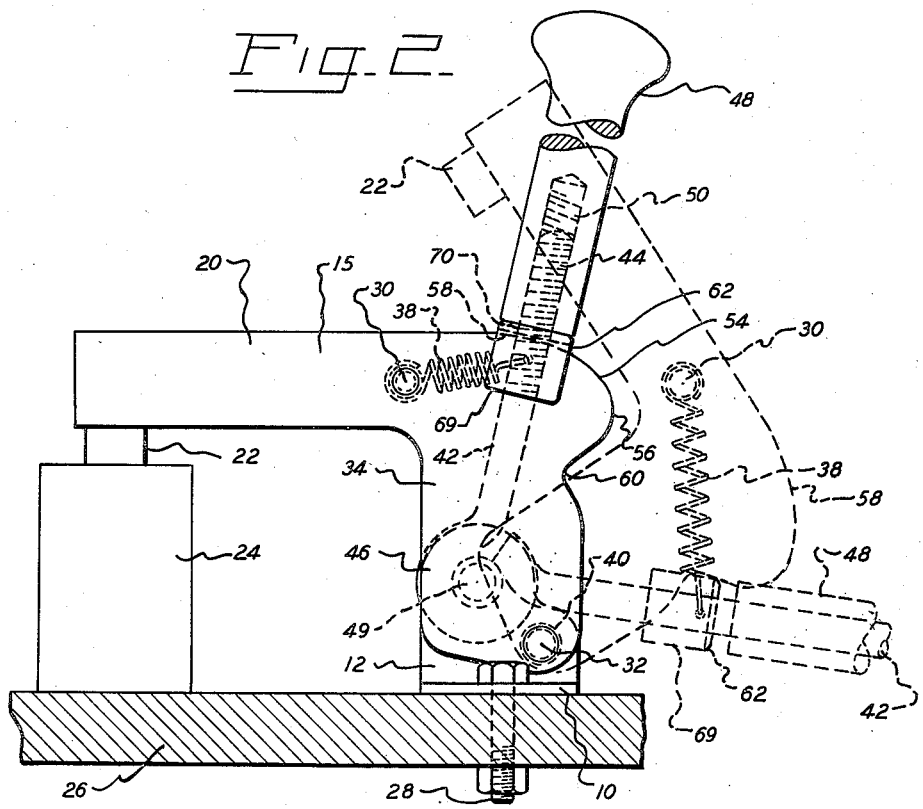

In the drawing wherein one embodiment of the invention is illustrated,

Fig. 1 is a side elevational view showing the clamp in its locked position in full outline, and in its open position in dotted outline, and Fig. 2 is a plan view of the clamp shown in Fig. 1.

Referring to the drawing, in Fig. 1 the improved clamping device consists of a sheet metal base portion 10 having spaced upright portions 12 and 14. The clamping member 15 in the form illustrated comprises two similar sheet metal stampings 16 and 18 which are welded together at 20 to provide a rigid member which carries the pressure pad 22 for clamping the work piece 24 against the supporting surface 26. The base 10 is shown anchored to the supporting surface 26 through suitable bolts 28.

Shoulder rivets 30 and 32 space the vertical portions 34 and 36 of the stampings 16 and 18, the rivet 30 acting as anchor for one end of the tension spring 38 and the rivet 32 acting as the pivot for the clamping member 15, the rivet 32 having bearing points in the uprights 12 and 14, as at 40.

The operating mechanism for the clamp 15 comprises an eye bolt 42 having a threaded portion in its upper end 44 and a loop 46, the latter embracing a shoulder rivet 49 supported between the uprights 12 and 14. The bolt 42 is free to swivel about the rivet 49, as indicated in dotted outline in Fig. 1. An operating and adjustment handle 48 has a threaded central bore 50 to receive the threaded upper end 44 of the bolt 42. The spring 38 is fastened at 52 through a hole in the bolt 42.

The stampings 16 and 17 are each shaped to provide similar cam surfaces 54, which from a point 56 to the point 58 are biased a greater distance from the pivotal axis of the bolt 42, as defined by the rivet 49. From the point 56 to the point 60 the contour of the stampings 16 and 18 is located at a decreasing distance from the swivel axis of the bolt 42.

The follower for the cam 54, in the illustrated embodiment of the invention, takes the form of a sheet metal stamping 62 having a central portion 64 which bridges the stampings 16 and 18, and turned down end portions 68 and 69 which function as guide portions that slide along in close relation to the outside of the stampings 16 and 18. The intermediate portion 64 is provided with a hole 70 to accommodate the shank of the eye bolt 42.

In the operation of the device above described, the operator pulls the handle 48 rearwardly to the dotted line position as shown in Fig. 1. In carrying out this operation the eye bolt 42 swings around its pivot 49 and the follower 62 traverses along the cam 54 passing over the point 56 inwardly to the clearance portion 60, which results in the clamp being tilted back into the position shown in dotted outline in Fig. 1. The tension of the spring 38 will hold the clamp in the position shown in dotted outline. To clamp a work piece the handle 48 is shoved forwardly from the dotted line position of Fig. 1 to the full line position, the follower 62 being advanced along the cam 54 to a position adjacent the point 58. At this point the work piece should be securely clamped. To take care of any wear or variation in the gauge or thickness of the work piece, at this point the operator may slightly twist the handle 48 which will urge the follower 62 towards the swivel axis of the eye bolt 42. In practice as the operator throws the handle 48 forward and the clamping arm 20 down to contact with the work piece 24, a slight twist of the wrist from the handle 48 will result in the clamping of any work piece fabricated within the limits of the usual commercial tolerances.

Having thus described my invention, what I desire to secure by Letters Patent and claim is:

1. A quick acting clamping device comprising a supporting portion, an upright bearing portion on the supporting portion, a substantially L-shaped clamping member swingably mounted at one end on the bearing portion and provided with a pressure pad at its swinging end, said clamping member having a cam surface on the outer side of the swinging end and around the angle of the mounted end, a threaded eye bolt swingably mounted on the upright bearing portion with its threaded end swingable adjacent to the cam surface, a cam follower adjustably movable along the threaded end of the eye bolt and having a portion slidably bearing against the cam surface, and an operating and adjustment handle having a threaded central bore adjustably receiving the threaded end of the eye bolt and provided with a portion bearing against the cam follower whereby rotational movement of the handle will adjust the operative position of the cam follower with respect to the cam surface and swinging movement of said handle will carry the cam follower forwardly and backwardly along the cam surface to move the swinging end of the clamping member into clamping and released positions.

2. A quick acting clamping device comprising a supporting portion, an upright bearing portion on the supporting portion, a substantially L-shaped clamping member swingably mounted at one end on the bearing portion and provided with a pressure pad at its swinging end, said clamping member having a cam surface on the outer side of the swinging end and around the angle of the mounted end, a threaded eye bolt swingably mounted on the upright bearing portion with its threaded end swingable adjacent to the cam surface, a cam follower adjustably movable along the threaded end of the eye bolt and having a portion slidably bearing against the cam surface, an operating and adjustment handle having a threaded central bore adjustably receiving the threaded end of the eye bolt and provided with a portion bearing against the cam follower whereby rotational movement of the handle will adjust the operative position of the cam follower with respect to the cam surface and swinging movement of said handle will carry the cam follower forwardly and backwardly along the cam surface to move the swinging end of the clamping member into clamping and released positions, and a tension spring connected between said bolt and the clamping member urging the bolt and cam follower to the clamping position and resiliently urging the clamping member to an open position as the handle is swung backwardly from a camming position.

HENRY H. MERRIMAN.

REFERENCES CITED

The following references are of record in the file of this patent:

UNITED STATES PATENTS

| Number | Name | Date |
|---|---|---|
| 873,077 | Patnod | Dec. 10, 1907 |
| 1,615,300 | Cantrell | Jan. 25, 1927 |
| 2,164,455 | Hart | July 4, 1939 |
| 2,236,439 | McKenna | Mar. 25, 1941 |

FOREIGN PATENTS

| Number | Country | Date |
|---|---|---|
| 563,957 | Great Britain | Sept. 6, 1944 |

OTHER REFERENCES

Oberg et al., "Drilling Practice and Jig Design," New York, The Industrial Press, 1915 TJ1260.O3, pages 172, 277 and 279.

Colvin et al., "Machine Tools and Their Operation," part II, New York, McGraw-Hill Book Company Inc., 1922, pages 14 and 15.